Figure 1:
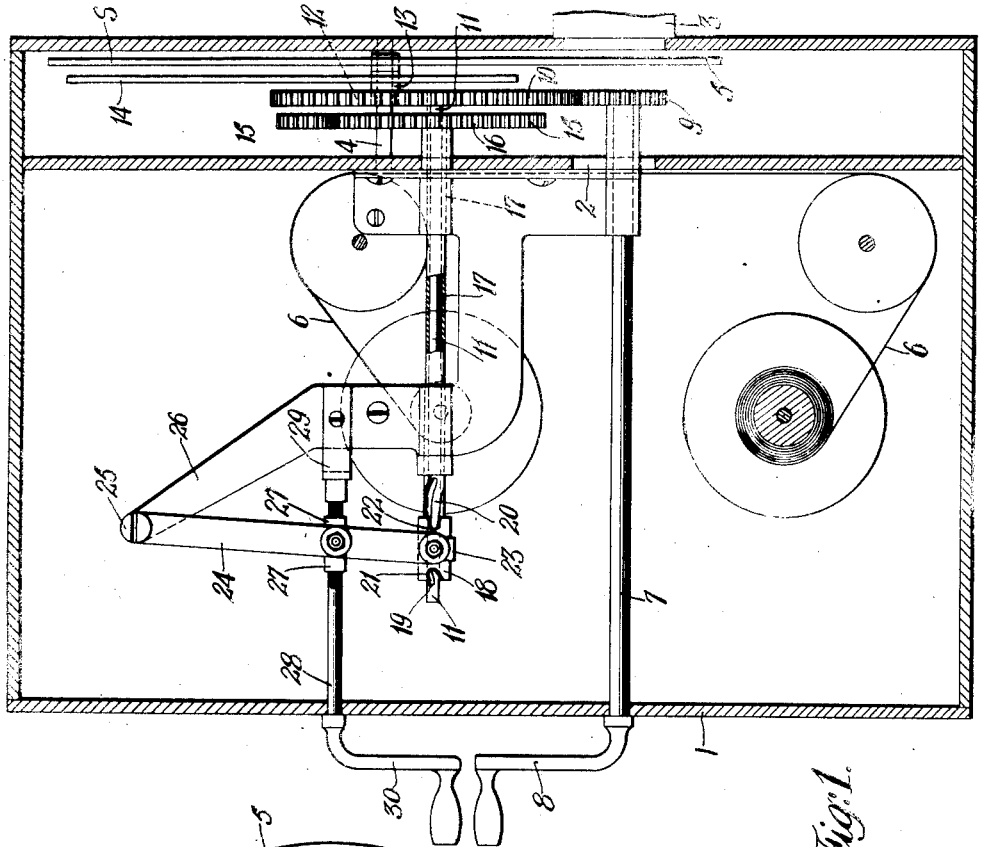

Oct. 27, 1925.                    1,558,483
W. V. D. KELLEY
MOTION PICTURE
Filed Nov. 12, 1920        2 Sheets-Sheet 1

Inventor
William V. D. Kelley,
By his Attorney

Oct. 27, 1925.
W. V. D. KELLEY
MOTION PICTURE
Filed Nov. 12, 1920
1,558,483
2 Sheets-Sheet 2
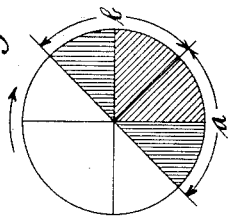
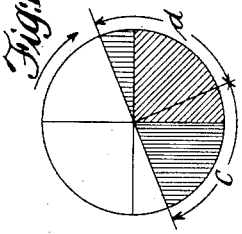
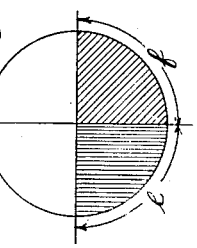
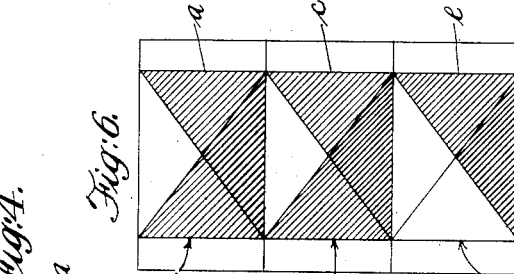
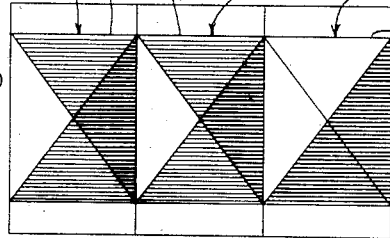
Inventor
William V. D. Kelley,
By his Attorney Patented Oct. 27, 1925.

1,558,483

UNITED STATES PATENT OFFICE.

WILLIAM V. D. KELLEY, OF NEWARK, NEW JERSEY, ASSIGNOR, BY MESNE ASSIGNMENTS, TO PRIZMA, INCORPORATED, A CORPORATION OF NEW JERSEY.

MOTION PICTURE.

Application filed November 12, 1920. Serial No. 423,533.

*To all whom it may concern:*

Be it known that I, WILLIAM V. D. KELLEY, a citizen of the United States, and resident of Newark, in the county of Essex and State of New Jersey, have invented certain new and useful Improvements in Motion Pictures, of which the following is a specification.

This invention relates to motion pictures, and has for its object to provide means whereby motion picture records may be made in black and white progressing into natural color, or vice versa, the purpose of the invention being to enable novel effects to be obtained, for example, by causing the view to at first appear in black and white and then gradually shift into natural color.

To accomplish this I have devised a novel method and apparatus for taking such pictures, together with the novel resulting products, constituting this invention.

The process consists in providing an ordinary color picture camera, wherein the color filter is normally synchronized with the film feed so as to expose each film area to one color, with a supplementary screen actuating mechanism whereby the screen can be advanced or retarded at will relatively to the film feed so that each picture area is exposed to colors. When the colors are complementary orange-red and green-blue, for example, and panchromatic negative emulsion is used, where each image area is exposed equally to each color, a black and white image value record will be produced, while with only one color exposed to each image area, the usual color value image will be produced. Where an exposure of one picture is greater to one color than to the other, an image of the predominant color value will be produced, but the succeeding image will predominate in values of the other color where a two color screen is used. Thus, in a long strip the images may be considered as in pairs, the first ones being equally exposed to both colors and forming ordinary black and white value images, and as the screen is asynchronously driven with respect to the film feed the color values commence to increase until finally each image records pure color. As the images will be in pairs, the color values will alternate. By providing manual means for controlling the movement of the screen relatively to the film feed in this manner, the number of pictures required to complete the shift is controllable at will. It will also be understood that the series can be started with pure color value images and progressively change into black and white value images.

Having obtained a negative strip containing such values, the next step is to print alternate images on single or double coated positive in one stratum or layer, and the remaining images in exact registry with the first in the remaining stratum or another layer, so that the images of each pair are superposed in exact registry. If double coated positive film be used for this purpose, one side will now be colored red-orange, and the other side complementary green-blue, which will give a black and white positive image where the film contains black and white values, and color value images where the film contains color value images. In coloring, it is of course insured that the green value images will be colored red, and the red value images will be colored green, according to the usual practice in coloring motion picture film. For an explanation of the printing and coloring steps to be employed, reference may be had to my Patent 1,259,411 of March 12, 1918, the negative strip obtained by the process of this invention being printed and registered on the positive in the same manner as disclosed in said patent, but the coloring method may be the same as there described, or any other suitable known method.

Figure 2:
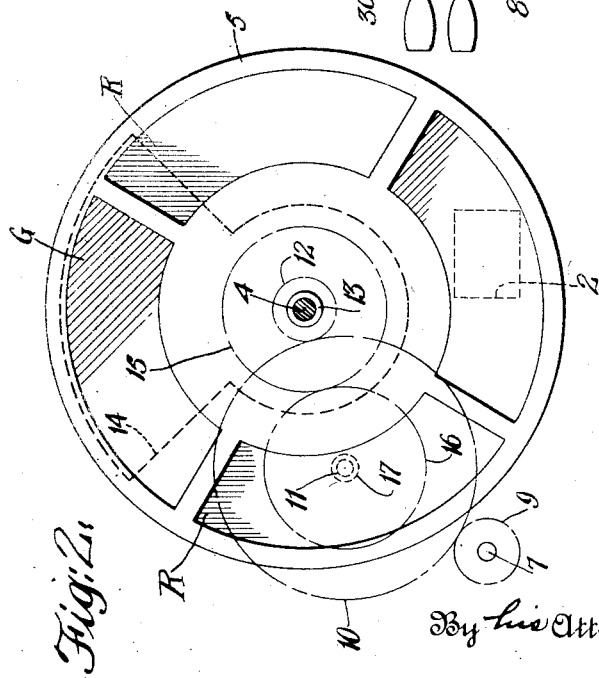

In the accompanying drawings,

Figure 1 is an elevation of a camera embodying the invention,

Figure 2 a view with the front removed, showing the arrangement of screen and driving mechanism, Figure 3 is a diagrammatic view of an object, Figure 4 is a diagrammatic view of a negative strip, Figure 5 a view of one side of the positive, Figure 6 a view of the other side, Figure 7 represents a section of positive carrying coatings on opposite sides, Figure 8 a section of positive with coatings on one side carrying two superposed images, Figure 9 is a diagram of the screen position for making the black and white records.

Figure 10 a diagram of the screen position for making one record predominating in red values and the other record predominating in green values, and Figure 11 is a diagram showing the screen position synchronized to record one color value on each image.

1 represents a camera having a window 2, with the usual lens tube 3, carrying suitable lenses, not shown. Mounted in front of the window 2 on shaft 4, is the color screen 5 having alternate sectors R G R G, each sector sufficing for a complete exposure. 6 represents the film running over suitable sprockets and positioning devices built according to common practice, and driven from the main shaft 7 by crank 8. The shaft 7 carries a gear 9 which meshes with a gear 10 on a shaft 11, which latter gear meshes with a gear 12 on the shutter shaft 13 loose on shaft 4. The shaft 4 carries the color screen 5 and the shaft 13 the shutter 14.

The shaft 4 carries a gear 15 which is driven by a gear 16 mounted on a hollow shaft 17, surrounding the shaft 11, and the shafts 11 and 17 are coupled together by a driving connection whereby the shaft 11, which drives the color screen on shaft 4 can be angularly shifted in either direction relatively to the shaft 11 which drives the shutter 14 on hollow shaft 13. The shutter runs at a constant speed owing to the direct driving connection from shaft 7 through gears 9, 10, and 12, and the shafts 11 and 17 are coupled together by a collar 18 which is spirally splined to shaft 11 by spiral spline 19 and to shaft 17 by spiral spline 20, the collar 18 having corresponding spiral grooves or notches 21—22, for driving both shafts together. When the collar 18 is in a median position the screen and shutter will both be driven in synchronism, with the screen making an exposure to a single color through one sector while the shutter uncovers the window, with the film shift occurring while the shutter covers the window and then the exposure to the other color occurs through the following sector of the screen. The operation is thus that of an ordinary motion picture camera with synchronized color screen, shutter, film feed, etc., operated by the ordinary hand crank 8.

In order to carry out the objects of this invention it is desired to change the timing of the color screen relatively to that of the shutter, leaving the latter to be constantly driven at the normal speed of taking. This object is accomplished by angularly shifting the shaft 11 relatively to the shaft 17 which is done by longitudinally shifting the collar 18 so that the angular relation between shafts 11 and 17 is changed with the result of angularly advancing or retarding the screen relatively to the shutter. This will cause each exposure to be made partly with one color of the screen and partly with the succeeding color, the next exposure taking the balance of the second color and a portion of the other color from the third sector of the screen. The mechanism here described is such as to permit this shifting to be progressive during a series of exposures, or a certain amount of shift can be made and then held or the shift can be made periodically. In practice with the mechanism here described a shift of the color screen of 45° will be sufficient to change from a black and white exposure on each picture area, due to equal exposure to both red and green, to a complete but different color exposure for each picture due to the screen being exactly synchronized with the shutter. During the shift, it will be seen that the screen moves asynchronously with respect to the shutter.

To accomplish the shift the rotating collar 18 carries a ring 23 which is engaged with a shifting lever 24, pivoted at 25 on a bracket 26 and carrying at its intermediate portion a nut 27 threaded on shaft 28 and held against rotation. The shaft 28 is journalled at one end in the bearing 29 and at the other in the camera casing and carries a hand crank 30 for shifting.

It will thus be seen that normally the operator will operate hand crank 8 in the usual manner, as for example making straight color exposures, and may then gradually shift the screen by operating crank 30 until the screen has shifted 45° at which time the operator will know that black and white exposures are being made.

Figure 3 shows a conventional object composed of red, white, green and black portions, and Figure 4 shows a strip of negatives produced by starting with the screen shifted to the position to take black and white negatives, shown diagrammatically in Figure 9, as at a, and progressively shifted through the position shown in Figure 10, to the straight color position shown in Figure 11. Figure 4 shows at a and b the negatives made during the exposure periods a and b of Figure 9, the negative c of Figure 4 through the exposure period c of Figure 10, which preponderates in red exposure owing to the shift of the screen, while negative d in Figure 4 being made through the exposure period d of Figure 10 preponderates in green value record. The negative e of Figure 4 is a red value negative made through the exposure period e of Figure 11, while the negative f of Figure 4 is a green value negative made through the exposure period f of Figure 11. It will be understood that in practice a considerable number of pictures will elapse between the taking of negatives a and b, and e and f, the gradation between each pair being almost imperceptible, but the shift can be made as fast as the operator actuates crank 30. Having accomplished the shift in one direction, as from black and white to color, reversing the movement will cause the shift to go from color to black and white.

A single strip positive printed from these negatives can be projected through a color screen with satisfactory results, provided the color screen be synchronized with the complete color records in the manner described in patent to Smith, 941,960, but the results would not be entirely satisfactory unless the projecting color screen can be shifted more or less in the same relation as the taking screen had been shifted. A positive strip made directly from the negatives of Figure 4 could also be alternately colored by toning or dyeing with complementary red and green, and projected at twice the normal projecting speed of black and white pictures.

In order to avoid the necessity of special projecting means, as well as the necessity of using projecting screens at all, this invention contemplates the making of a positive strip which can be colored according to known methods, so as to be projectible in an ordinary projector at normal speed.

This I accomplish by superposing the negatives of each pair so as to form a composite positive image, and then coloring corresponding positives of each pair with a like color complementary to the color values of those pairs in which each image records a single color. In present day cameras for taking color value pictures, means are provided for marking the green or red value images, and sometimes both so that these same marking devices with one set to mark a pure color value image will enable the pairs to be distinguished in the negative, so that when the positive is printed and developed the operator will know which color to apply.

The composite positive can be made on ordinary double coated positive as shown in Figure 7 in which images $a\ c\ e$ are on one side and images $b\ d\ f$ registered therewith on the other side, or on a positive such as shown in Figure 8 in which images $a\ c\ e$ are in one stratum and images $b\ d\ f$ in another of emulsion on one side of the positive. In making the positive prints, careful registration must be had, which can be accomplished according to the method disclosed in patent to Kelley and Mason 1,350,023 dated August 17th, 1920, and the coloring of double coated positive can be carried out as disclosed in my Patent 1,259,411 of March 12, 1918. In so far as the coloring of the images of black and white pairs is concerned, it will obviously make no difference which color is applied to the respective images of the pair, but the color reproduction in the final positive will not be accurate unless the pairs of single color value images $e\ f$ are colored with complementary colors. Thus the positive areas $a\ c\ e$ will always be colored a like color as green (see Fig. 6) and the positive areas $b\ d\ f$ will always be colored red (see Figure 5).

The method of making the positive shown in Figure 8 may be by printing images $b\ d\ f$ in one coating, developing, coloring, varnishing, resensitizing and then printing images $a\ c\ e$ in registration, developing and coloring, or by printing different colors in one coating according to known methods an example of which is my Patent 1,278,161, September 10, 1918.

Instead of coloring the positive images as in Patent 1,259,411, it is obvious that gelatin coloring and bichromating coloring methods may be used, many of which are well known in the art. Where I use the term coloring, I mean to include both the toning and dyeing of silver images, as well as the equivalent treatment of gelatin to fix color, usually by acid dyes. It is further to be understood that the changing of negatives into color positives, several methods for which are known, is to be regarded as an equivalent method, for the purpose of coloring the projecting positive areas, to the particular method of changing a black and white positive image to a transparent color image referred to herein by way of example and not as a limitation.

This invention furnishes decided features of novelty in the method, apparatus, and product, and is of decided advantage in the commercial art because of the facility with which a black and white film can gradually merge into a color film or vice versa, thus not only producing an effect of unusual interest to audiences, but exemplifying the advantages of rendition in natural color by reason of enhanced perspective, accuracy, etc.

This invention is useful for transformation pictures in which a film strip representing for example, the face of a woman against a background of a huge lily, and otherwise lifeless or inanimate, shown first in black and white giving the effect of paleness in the face and absence of color in the lily, and slowly and imperceptibly transforms the lifeless picture into one of natural color, beauty and life. These transformations can be effected in from two feet of standard film up, and eight to twelve or twenty feet give very satisfactory results, each foot of standard film ordinarily containing sixteen pictures.

The invention is susceptible to various modifications in apparatus and procedure herein described without departing from its broad scope, as I believe I am the first to provide a method and apparatus whereby a shift can be made between black and white and pure color while taking at ordinary speed, and also in providing a projecting positive which will run on an ordinary projector at normal speed and shift between black and white and color.

What I claim is:

1. The method which consists in progressively varying the values recorded in a series of negatives made on panchromatic emulsion between black and white and cycles of pure colors.

2. The method which consists in making successive exposures of panchromatic negative while asynchronously moving color screens together recording complete color to vary the values recorded progressively between black and white and cycles of pure colors.

3. The method of producing a film changing from black and white to color in projection, which consists in making successive pairs of negatives wherein the pictures of each pair are each exposed to two complementary colors progressively inversely varying during the series until each picture of a pair records a single color, superposing prints of each pair on each area of positive, and coloring the positive emulsion carrying corresponding positives of each pair with colors such that each positive area reproduces pictures varying between black and white and natural color according to the total values on each area.

4. The method which consists in producing a positive having color values varying between black and white values and cycles of pure color values, and coloring said positives in such manner as to reproduce pictures in projection varying between black and white and natural colors.

5. An image carrying strip having pairs of image records, one image of each pair preponderating in recording one color, and the other image preponderating in recording a complementary color, the preponderance of color value records in the series progressively varying.

6. A strip of photographic images progressively varying between images recording black and white values and images recording pure colors.

7. A strip of photographic images progressively varying between images recording black and white values and alternating images each recording one of two complementary colors.

8. A photographic positive film strip having a series of images at one portion substantially recording black and white and progressively changing into images at another portion each recording a single color, 9. A photographic positive film strip having a series of images at one portion substantially recording black and white and progressively changing into images at another portion each recording a single color, the colors recorded by successive latter images being complementary.

10. A photographic positive strip having a series of image areas each carrying in different strata registered images, the images in one stratum being colored with one color and those in the other stratum with a complementary color, and the images varying in recording color so that at one portion the colored images on an area together produce a black and white picture and at another portion the colored images on an area produce a natural color picture.

11. A photographic positive strip having a series of image areas each carrying in different strata registered images, the images in one stratum being colored with one color and those in the other stratum with a complementary color, and the images varying in recording color so that at one portion the colored images on an area together produce a tinted picture preponderating in black and white characteristics and at another portion the colored images on an area produce a picture preponderating in natural color characteristics, and the pictures on intervening areas progressively varying from one to the other.

12. A cinematographic film comprising a succession of pictures each of which bears record of light rays limited to substantially complementary colors, the records of rays of different ones of said complementary colors predominating in respectively successive pictures.

13. A cinematographic film comprising a succession of pictures each of which bears record of light rays successively limited to a plurality of colors respectively corresponding in value to different definitely limited portions of the visible spectrum, the record of light rays of a different color predominating in successive pictures and a given picture bearing record of light rays of a color recorded in the picture preceding said given picture.

14. A motion picture positive comprising a series of black and white images arranged to be projected in sequence, a series of multi-color images arranged to be projected in sequence and a third series arranged to be projected in sequence between the other two series and so colored as to act as a buffer series to lessen the apparent contrast between the black and white and multi-color series when projected.

15. A motion picture positive comprising a series of black and white images arranged to be projected in sequence, a series of multi-color images arranged to be projected in sequence and a third series arranged to be projected in sequence between the other two series and so colored as to harmonize with the multi-color series and as to act as a buffer series to lessen the apparent contrast between the black and white and multi-color series when projected.

16. In cinematography the process consisting in limiting the light rays acting upon each one of a plurality of successive image areas of a film, successively to a plurality of colors one of which predominates, said colors respectively corresponding in value to different definitely limited portions of the visible spectrum, the colors used with respect to a given area being so employed as to produce as to that area a total color effect different from the total color effect of the colors employed with respect to the area succeeding said given area and one of the colors employed with respect to any given image area being employed also with respect to the image area succeeding said given image area.

17. In cinematography the process consisting in limiting the light rays acting upon each one of a plurality of successive image areas of a film, successively to the same plurality of colors a different one of which predominates with respect to successive image areas, the light acting upon said film having at all times a color as distinguished from white light.

Signed at New York, in the county of New York and State of New York, this 11th day of November, A. D. 1920.

WILLIAM V. D. KELLEY.